United States Patent [19]

Edwards et al.

[11] 4,152,308

[45] May 1, 1979

[54] SILICEOUS FILLED VULCANIZATES

[75] Inventors: Douglas C. Edwards; Kyosaku Sato, both of Sarnia, Canada

[73] Assignee: Polysar Limited, Sarnia, Canada

[21] Appl. No.: 884,216

[22] Filed: Mar. 7, 1978

[30] Foreign Application Priority Data

Apr. 14, 1977 [CA] Canada .................................. 276217

[51] Int. Cl.$^2$ ............................................... C08L 91/00
[52] U.S. Cl. ............................. 260/23 H; 260/23 AR; 260/23.7 M; 260/23.7 H; 260/23.7 B; 260/23.7 R; 260/42.31; 260/42.32; 260/42.33; 260/42.34; 260/42.35; 260/42.39; 260/42.41; 260/42.57; 260/42.37
[58] Field of Search ......... 260/23 M, 23 AR, 23.7 M, 260/23.7 H, 23.7 R, 23.7 B, 42.57, 42.31, 42.37, 42.32, 42.33, 42.34, 42.35, 42.39, 42.41

[56] References Cited

U.S. PATENT DOCUMENTS

| | | | |
|---|---|---|---|
| 3,679,627 | 7/1972 | Harrell et al. | 260/23.7 |
| 3,856,723 | 12/1974 | Vrisakis et al. | 260/42.37 |
| 3,950,304 | 4/1976 | Inomata et al. | 260/42.37 |
| 3,975,326 | 8/1976 | de Vrieze | 260/23 H |

*Primary Examiner*—Melvyn I. Marquis
*Attorney, Agent, or Firm*—Stevens, Davis, Miller & Mosher

[57] ABSTRACT

There is provided a process, and the product of that process, for the production of improved silica or calcium silicate filled rubbery vulcanizates which comprises the preparation of a mixture comprising a vulcanizable hydrocarbyl polymer containing hydroxyl groups, silica or calcium silicate and an organic acid or salt thereof, shearing the mixture at an elevated temperature, incorporating vulcanization active compounds and vulcanizing to produce the improved vulcanizates. Such improved vulcanizates may be used generally in the rubber industry.

20 Claims, No Drawings

SILICEOUS FILLED VULCANIZATES

This invention is directed to improved silica-filled and calcium silicate-filled rubbery vulcanizates. In particular, the polymer of the filled vulcanizate contains certain selected groups which are caused to interact with the silica or calcium silicate.

The effects due to the presence of fillers in polymer vulcanizates are well known. Comparison of a gum vulcanizate with a filled vulcanizate shows the improved strength and wear characteristics in the filled vulcanizate when the filler used belongs to the class known as reinforcing fillers. The types of fillers that may be compounded with polymers are quite diverse in nature, the selection of the type of filler being mainly dependent on the properties required of the vulcanizate derived therefrom, but are normally divided into reinforcing and non-reinforcing types. From the group of reinforcing fillers, two which have received the most attention are the various carbon blacks and silicas. Of these two types, carbon black is the most dominant because of price and the overall balance of vulcanizate properties.

There has existed a desire to improve the characteristics of silica-filled and silicate-filled vulcanizates and to make them more closely equivalent to carbon black filled vulcanizates. This desire arises partly from the fact that light coloured vulcanizates, which obviously cannot contain carbon black, have a definite place in the market and partly from the fact that silica and silicates do not depend, in principle, upon the use of hydrocarbons for their manufacture. Any attempt to improve the properties of silica or silicate-filled vulcanizates to more closely match the properties of carbon black filled vulcanizates is thus timely and would fill a need long recognized by the industry.

Vulcanizates obtained from silica or silicate-filled polymer, while having certain useful properties, are known to be deficient due to being boardy, which may be described as a stiffness at low elongations and lack of resilience, and due to high tensile set, both of which deficiencies can be avoided in carbon black filled vulcanizates.

In attempts to overcome some of the deficiencies associated with the use of silica fillers in polymers, silica has been treated with a number of chemicals to modify the chemical nature of the surface of the silica particles. Thus, silica has been treated with diazomethane, with alcohols and with a range of organo-silanes including, for example, trimethylchlorosilane. However, these treatments, while leading to minor improvements, were not successful in overcoming the overall deficiencies.

Other chemical compounds have been mixed with silica-polymer systems for a different reason. Silica, due to its highly absorbtive surface, tends to preferentially absorb the chemical curing agents normally used which leads to undercuring during the vulcanization step. In order to overcome this problem, certain chemicals such as glycols, e.g. diethylene glycol or poly(ethylene glycol), amines, e.g. triethanolamine and guanidines have been added during the compounding steps and allow the use of normal levels of curing agents to achieve the expected level of cure. The overall aforementioned deficiencies are such found in such vulcanizates.

None of these chemical treatments or chemical additives have overcome the deficiencies associated with the use of silica as filler in polymeric vulcanizates.

A more recent improvement in the art of using silica as a filler for polymers is the use of coupling agents. Significant improvements in the vulcanizate properties can be attained when coupling agents are added. The most effective coupling agents are organofunctional silanes; titanium-containing compounds are also known. Suitable organo-functional silanes include the mercaptosilanes. Vulcanizates containing mercaptosilanes added to the silica filler during the compounding stage generally show, in comparison with silica-filled vulcanizates not containing such silanes, increased values for modulus and tensile strength and decreased elongation at break—generally, properties more comparable to the properties of carbon black filled vulcanizates. Although a number of coupling agents are commercially available their cost is extremely high, making them not very practical for general use.

Thus, the problem still exists that silica-filled vulcanizates, of reasonable cost, cannot be produced to have acceptable strength, resilience and tensile set properties.

We have now discovered improved silica filled and silicate-filled rubbery vulcanizates and processes of preparing such improved filled rubbery vulcanizates.

It is an objective of this invention to provide an improved silica filled or calcium silicate filled rubbery vulcanizate, wherein the vulcanizate exhibits improved physical properties including at least one of and preferably at least two of higher 300% modulus and tensile strength, lower Young's modulus, lower 25% modulus, lower tensile set, lower heat build-up and lower hardness.

It is a further objective of this invention to provide a process for the preparation of improved silica filled or calcium silicate filled rubbery vulcanizates, wherein the silica or silicate is mixed prior to the vulcanization step, with a rubbery polymer containing selected functional groups, said mixing being in the presence of a small amount of an additive as hereinafter defined and said mixing being at an elevated temperature and under shearing conditions.

In accordance with the invention, we have found a process for the production of improved silica or calcium silicate filled rubbery vulcanizates which process comprises preparing a mixture comprising per 100 parts by weight of a vulcanizable hydrocarbyl polymer containing hydroxyl groups, from about 5 to about 100 parts by weight of silica or calcium silicate and from about 1 to about 5 parts by weight of an organic acid, or a salt thereof, subjecting said mixture to a treatment wherein it is sheared at an elevated temperature, cooling said mixture, incorporating into said mixture vulcanization active compounds and vulcanizing by heating at an elevated temperature to produce the improved silica or calcium silicate filled rubbery vulcanizate.

Further, in accordance with the invention, we have found a process for the production of improved silica or calcium silicate filled rubbery vulcanizates which process comprises preparing a mixture comprising per 100 parts by weight of a vulcanizable hydrocarbyl polymer containing from about 1.5 to about 80 millimoles of hydroxyl groups per 100 grams of polymer, from about 5 to about 100 parts by weight of silica or calcium silicate and from about 1 to about 5 parts by weight of an organic acid or a salt thereof selected from the $C_{15}$–$C_{20}$ fatty acids, the $C_{15}$–$C_{20}$ unsaturated fatty acids and the aromatic carboxylic acids, or the alkali metal, alkaline earth metal or ammonium salts thereof, and from the aryl sulphonic acids, subjecting said mixture to a treatment wherein it is sheared at a temperature of from about 100° to about 175° C., cooling said mixture, incorporating into said mixture vulcanization active compounds and vulcanizing by heating at an elevated temperature to produce the improved silica or calcium silicate filled rubbery vulcanizate.

Still further in accordance with the invention, there is provided an improved silica or calcium silicate filled rubbery vulcanizate obtained by the vulcanization of a mixture comprising per 100 parts by weight of vulcanizable hydrocarbyl polymer containing hydroxyl groups, from about 5 to about 100 parts by weight of silica or calcium silicate and from about 1 to about 5 parts by weight of an organic acid or a salt thereof, said mixture having been subjected to shearing at an elevated temperature prior to incoporation of vulcanization active compounds and vulcanization.

Still further in accordance with the invention, there is provided an improved silica or calcium silicate filled rubbery vulcanizate obtained by the vulcanization of a mixture comprising per 100 parts by weight of vulcanizable hydrocarbyl polymer containing from about 1.5 to about 80 millimoles of hydroxyl groups per 100 grams of polymer, from about 5 to about 100 parts by weight of silica or calcium silicate and from about 1 to about 5 parts by weight of an organic acid or salt thereof selected from the $C_{15}$–$C_{20}$ fatty acids, the $C_{15}$–$C_{20}$ unsaturated fatty acids and the aromatic carboxylic acids, or the alkali metal, alkaline earth metal or ammonium salts thereof, and from the aryl sulphonic acids, said mixture having been subjected to shearing at a temperature of about 100° to about 175° C. prior to incorporation of vulcanization active compounds and vulcanization.

In order to establish whether improved vulcanizate properties are achieved, it is necessary to be able to define these properties in measurable quantities. For vulcanizates of polymeric materials, the conventional type of stress-strain measurement supplies much useful information. Prior art silica-filled vulcanizates exhibit, in comparison with carbon black filled vulcanizates, a higher modulus at low degrees of extension (e.g. 25% strain) and a lower modulus at high degrees of extension (e.g. 300% strain). By means of slow rate extension tests, the modulus at 25% extension is readily determined. Further, the slope of the stress-strain curve at zero extension can also be determined: this is the Young's modulus. The Young's modulus and the 25% modulus illustrate the stiffness at low elongations. Stress-strain tests conducted at the conventional rates of extension provide the 100% modulus, the 300% modulus, the elongation at break and the tensile strength. On completion of a stress-strain test, the two ruptured pieces of the test specimen are, ten minutes after rupture, carefully fitted together so that they are in contact over the full area of the break—the distance between the two bench marks is measured. The tensile set is the extension remaining in the test piece and is expressed as a percentage of the original test piece length. Thus, test procedures are known whereby it is readily possible to quantify the quality of the vulcanizates.

The polymers which may be used in the present invention are vulcanizable hydrocarbyl polymers which contain functional groups attached to the polymer chain. The functional groups are hydroxyl groups and may be attached either directly to the polymer chain or may be attached to the polymer chain through a hydrocarbyl group. Suitable vulcanizable hydrocarbyl polymers are essentially $C_4$–$C_6$ conjugated diolefin polymers, polymers of $C_4$–$C_6$ conjugated diolefins and at least one other copolymerizable vinyl or vinylidene-containing monomer, polymers comprising a $C_4$–$C_6$ isoolefin and polymers comprising one or two alpha olefins. Examples of such suitable polymers include polybutadiene, polyisoprene, butadiene-styrene polymers, isoprene-styrene polymers, butadiene-acrylonitrile polymers, butadiene-methacrylonitrile polymers, isoprene-acrylonitrile polymers, isobutylene-isoprene polymers, chlorinated or brominated isobutylene-isoprene polymers, ethylene-propylene polymers, ethylene-propylene- non-conjugated diolefin polymers and polychloroprene. All the polymers are solid high molecular weight materials, having Mooney viscosities within the range of about (ML 1+4 at 100° C.) 30 to about 150. The functional groups may be incorporated into the polymers by copolymerization of suitable monomers or by chemical modification of the polymer. Incorporation of the functional groups by copolymerization can only be achieved in an emulsion free radical polymerization system whereas incorporation of functional groups by chemical modification can be achieved with polymers prepared by emulsion free radical polymerization and with polymers prepared by other methods of polymerization. One of average skill in the art will be able to readily relate monomers suitable for emulsion free radical polymerization system. Suitable copolymerizable monomers include hydrxyethyl methacrylate, hydroxyethyl acrylate, hydroxypropyl acrylate or methacrylate, hydroxypropyl, crotonate, di(2-hydroxyethyl)maleate, di(2-hydroxyethyl)fumarate, N-ethanol acrylamide, hydroxyethyl vinyl ether and di-ethyleneglycol monovinyl ether. Suitable chemical modification may include partial epoxidation followed by reduction of carbon-carbon double bonds in a polymer containing unsaturation, treatment with an alkali metal alkyl compound such as butyl lithium followed by hydrolysis and hydrolysis of halogen groups in a polymer molecule. Thus the polymers which may be used in this invention are the vulcanizable hydrocarbyl polymers hereinbefore described and containing hydroxyl groups attached to the polymer chain.

The concentration of the bound functional groups in the polymer will be from about 1.5 millimoles per 100 grams of polymer to about 80 millimoles per 100 grams of polymer. Preferably, the concentration of the bound functional groups is from about 2 to about 60 millimoles per 100 grams of polymer. Suitable concentration of the functional groups can also be achieved by mixing a polymer having a concentration of bound functional groups of from about 20 to about 80 millimoles per 100 grams of polymer with a like polymer having no functional groups, the two polymers being mixed in such a ratio that the concentration in the mixture of functional groups is from about 4 to about 60 millimoles of functional groups per 100 grams of the mixture of polymers.

The silica which is mixed with the polymer to produce the compounds and vulcanizates of this invention is of fine particle size, that is to say, generally less than about 0.1 micron but larger than about 0.01 microns average particle size. Such silicas are well known in the art and may be selected from the fumed silicas, which are relatively anhydrous, and from the precipitated silicas, which contain water of hydration. The calcium silicate is a precipitated calcium silicate having an average particle size of about 0.1 micron to about 0.01 micron. Preferably, the silica has an average particle size of 0.015 to 0.05 microns and is a precipitated silica.

Preferably, the calcium silicate has an average particle size of 0.015 to 0.05 microns.

The amount of silica or calcium silicate which may be mixed with the polymer is from about 5 parts to about 100 parts by weight per 100 parts by weight of polymer. In normal practice, the higher concentration of silica, or silicate, that is, from about 60 to about 100 parts by weight per 100 parts by weight of polymer, will be mixed with polymers which may contain hydrocarbon oil or hydrocarbyl plasticizer or to which hydrocarbon oil or hydrocarbyl plasticizer is added during the compounding stage. Additional fillers may also be added to the silica-polymer mixture, such additional fillers being selected from the generally non-reinforcing or semi-reinforcing fillers such as calcium carbonate, titanium dioxide, calcium sulphate, clays, silicates and from the carbon blacks. Such additional fillers may be present in amounts from about 5 to about 150, preferably from about 5 to about 80 parts by weight per 100 parts by weight of polymer. Carbon black can also be present at up to about 3 parts by weight per 100 parts by weight of polymer as a colouring agent.

The additive which is also added to the silica or calcium silicate polymer mixture is a material which appears to promote a reaction between the functional groups of the polymer and the silica surface. The exact nature of the role played by this chemical is uncertain at this time but it is known that the presence of such a material in the silica or calcium silicate polymer mixture leads to improved properties of the vulcanizates. The additive is selected from organic acids or salts thereof selected from the $C_{15}-C_{20}$ fatty acids, the $C_{15}-C_{20}$ unsaturated fatty acids and the aromatic carboxylic acids, or the alkali metal, alkaline earth metal or ammonium salts thereof and from the aryl sulphonic acids. Suitable $C_{15}-C_{20}$ fatty acids include palmitic acid and stearic acid; suitable $C_{15}-C_{20}$ unsaturated fatty acids include oleic acid and linoleic acid; suitable aromatic carboxylic acids include benzoic acid, phthalic acid, cinnamic acid and hydroxybenzoic acid; suitable salts of these acids include the sodium, potassium, calcium, zinc and ammonium salts. Suitable aryl sulphonic acids include benzene sulphonic acid, the toluene sulphonic acids and the xylene sulphonic acids. Preferred organic acids or salts thereof are stearic acid and the sodium, potassium or zinc salts thereof.

The quantity of the additive added to the silica or calcium silicate polymer mixture is from about 1 to about 5 parts by weight of chemical per 100 parts by weight of polymer. Preferably the quantity of the additive added is from about 1 to about 3 parts by weight of additive per 100 parts by weight of polymer.

The additive may be added to the silica or calcium silicate polymer mixture either during the initial mixing of the silica or silicate and polymer or it may be added in a subsequent mixing operation.

It is necessary that the silica or calcium silicate polymer mixture be subjected to a treatment wherein it is sheared at an elevated temperature in the presence of the additive. Such shearing may be achieved on a two roll rubber mill or in an internal mixer and may be during the mixing of the polymer and filler or as a subsequent step to such mixing. The elevated temperature is from about 100° to about 175° C., preferably from about 120° to about 160° C. The mixture is subjected to such treatment for a time of from about 0.25 to about 10 minutes, preferably from about 0.5 to about 5 minutes. For ease of operation, it is preferred to add the additive during the initial mixing of the silica or silicate and polymer.

The mixing of the silica or calcium silicate and polymer may be achieved using conventional rubber mixing equipment including two roll rubber mills and internal mixers. The subsequent addition after cooling from the shearing at elevated temperature, of other compounding ingredients and vulcanization active compounds is by means conventional in the rubber industry including, especially when vulcanization active compounds are involved, two roll rubber mills operated at relatively low temperatures, usually below about 65° C. Suitable vulcanization systems are chosen to match the nature of the polymer and the intended use for the vulcanizate and are well known in the industry. The nature of the vulcanization system is not critical to this invention. The compounds are vulcanized by heating at an elevated temperature, for example at temperatures of 125°–200° C. for times of from 1 minute to 10 hours, preferably at temperatures of 150°–170° C. for from 3 to 60 minutes.

The vulcanizates produced from the silica or calcium silicate polymer mixtures of this invention possess significantly improved physical properties when compared with comparable prior art vulcanizates except those containing an organofunctional coupling agent. Comparison of the vulcanizates of this invention when they contain 50 parts by weight of silica per 100 parts by weight of polymer with prior art vulcanizates also containing 50 parts of silica, shows that the vulcanizates of the present invention have at least one of and preferably at least two of the following properties: a reduced Young's modulus, a reduced modulus at 25% extension, an increased modulus at 300% extension, an increased tensile strength and a reduction in the tensile set. Preferably, the vulcanizates of this invention will have a reduced Young's modulus and a reduced 25% modulus and most preferably the vulcanizates will have a reduced Young's modulus, a reduced 25% modulus, an increased and a reduced tensile set.

The following examples are provided to illustrate, but not limit, the invention and all parts are parts by weight unless otherwise stated.

EXAMPLE 1

A polymer containing acrylonitrile, butadiene and hydroxyethyl methacrylate was prepared by a conventional free radical emulsion polymerization technique at a polymerization temperature of 13° C. The polymer contained about 34 weight percent of acrylonitrile and about 1 weight percent of hydroxyethyl methacrylate.

Portions (100 parts by weight) of this polymer were mixed, on a rubber mill, with 50 parts by weight of silica (Experiment A) and for Experiment B additionally with 2 parts by weight of sodium stearate and for Experiment C additionally with 2 parts by weight of ammonium salicylate. The silica used was HiSil* 233. The compounds were heat treated on a rubber mill for 3 minutes at 150° C. After cooling, the compounds were put into a cool (about 40° C.) rubber mill and dicumyl peroxide (DiCup* 40C), in parts by weight per 100 parts by weight of polymer, was added as shown in Table I. The compounds were vulcanized by heating at 160° C. for 30 minutes.
*Registered Trade Mark The vulcanizate properties, shown in Table I, clearly demonstrate the improved properties found for the silica filled vulcanizates of this invention when compared with the control, Experiment A.

TABLE I

| Experiment | A | B | C |
|---|---|---|---|
| Polymer wt. | 100 | 100 | 100 |
| Silica wt. | 50 | 50 | 50 |
| | | Sodium stearate | Ammonium salicylate |
| Additive wt. | — | 2 | 2 |
| Heat treat - 3 minutes at 150° C. on mill | | | |
| Dicumyl peroxide wt. | 4 | 4 | 3.5 |
| Vulcanize - heat at 160° C. for 30 minutes | | | |
| Vulcanizate properties | | | |
| Tensile strength (kg/cm$^2$) | 306 | 260 | 335 |
| Elongation % | 450 | 380 | 490 |
| 100% Modulus kg/cm$^2$ | 35 | 31 | 25 |
| 300% Modulus kg/cm$^2$ | 180 | 181 | 171 |
| 25% Modulus kg/cm$^2$ | 12 | 9 | 8 |
| Young's Modulus kg/cm$^2$ | 146 | 59 | 48 |
| Tensile set % | 8 | 4 | 7 |
| Hardness Shore A$_2$ | 80 | 80 | 75 |

EXAMPLE 2

The acrylonitrile-butadiene-hydroxyethyl methacrylate polymer of Example 1 was mixed with silica and a range of additives, as shown in Table 2, subjected to heat treatment, by milling at 150° C. for 3 minutes, compounded with dicumyl peroxide (DiCup 40C) and vulcanized by heating for 30 minutes at 160° C., as in Example 1.

The vulcanizate properties are shown in Table II, from which it is clear that the improved properties are found for each of the additives used in the heat treatment stage.

TABLE II

| Experiment No. | D | E | F | G | H | I | J |
|---|---|---|---|---|---|---|---|
| Additive type | I | II | III | IV | V | VI | VII |
| Additive quantity wt. | 2 | 2 | 2 | 2 | 2 | 2 | 1.5 |
| Dicumyl peroxide wt. | 4 | 4 | 4 | 4 | 4 | 4 | 6 |
| Vulcanizate properties | | | | | | | |
| Tensile strength kg/cm$^2$ | 315 | 286 | 300 | 300 | 266 | 300 | 260 |
| Elongation % | 350 | 320 | 370 | 420 | 360 | 480 | 320 |
| 100% Modulus kg/cm$^2$ | 35 | 38 | 35 | 30 | 35 | 30 | 40 |
| 300% Modulus kg/cm$^2$ | 258 | 250 | 228 | 188 | 213 | 159 | 228 |
| 25% Modulus kg/cm$^2$ | 8 | 9 | 9 | 9 | 10 | 9 | 9 |
| Young's Modulus kg/cm$^2$ | 54 | 54 | 57 | 61 | 74 | 71 | 58 |
| Tensile set % | 4 | 4 | 5 | 4 | 4 | 7 | 5 |
| Hardness Shore A$_2$ | 77 | 77 | 78 | 77 | 78 | 78 | 79 |

I - sodium stearate
II - potassium stearate
III - calcium stearate
IV - zinc stearate
V - ammonium stearate
VI - stearic acid
VII - p-toluene sulphonic acid

EXAMPLE 3

Using a polymer similar to that of Example 1, compounds were prepared containing, per 100 parts by weight of polymer, 60 parts by weight of silica, 15 parts by weight of di-octyl phthalate and two parts by weight of the additives shown in Table III. These compounds were heat treated by milling at 150° C. for 3 minutes. On cooling, further compounding ingredients were mixed in on a cool (about 40° C.) rubber mill as follows, all being parts by weight per 100 parts by weight of polymer: zinc oxide 5, stearic acid 1.5, benzothiazyl disulphide 1.5, tetramethyl thiuram disulphide 0.5 and sulphur 1.75. These compounds were vulcanized by heating at 166° C. for 15 minutes.

The vulcanizate properties are given in Table III. The improved vulcanizate properties are found with all the additives used with the sulphur vulcanization system.

TABLE III

| Experiment No. | K | L | M | N | O |
|---|---|---|---|---|---|
| Additive type | 1 | 2 | 3 | 4 | 5 |
| Vulcanizate properties | | | | | |
| Tensile strength kg/cm$^2$ | 274 | 273 | 282 | 281 | 273 |
| Elongation % | 570 | 560 | 560 | 530 | 540 |
| 100% Modulus kg/cm$^2$ | 15 | 17 | 20 | 20 | 20 |
| 300% Modulus kg/cm$^2$ | 105 | 105 | 108 | 125 | 115 |
| 25% Modulus kg/cm$^2$ | 7 | 7 | 7 | 8 | 7 |
| Young's Modulus kg/cm$^2$ | 65 | 68 | 98 | 83 | 67 |
| Tensile set % | 15 | 16 | 11 | 13 | 12 |
| Hardness Shore A$_2$ | 75 | 75 | 74 | 77 | 74 |

1 - sodium stearate
2 - potassium stearate
3 - zinc stearate
4 - stearic acid
5 - oleic acid

What is claimed is:

1. A process for the production of improved silica or calcium silicate filled rubbery vulcanizates which process comprises preparing a mixture comprising 100 parts by weight of a vulcanizable hydrocarbyl polymer containing from about 1.5 to about 80 millimoles of hydroxyl groups per 100 grams of polymer, from about 5 to about 100 parts by weight of silica or calcium silicate, and from about 1 to about 5 parts by weight of an organic acid or a salt thereof, subjecting said mixture to a treatment wherein it is sheared at a temperature of from about 100° C. to about 175° C., cooling said mixture, incorporating into said mixture vulcanization active compounds, and vulcanizing by heating at an elevated temperature to produce the improved vulcanizate, said organic acid or salt thereof being selected from the C$_{15}$–C$_{20}$ fatty acids, the C$_{15}$–C$_{20}$ unsaturated fatty acids and the aromatic carboxylic acids, or the alkali metal, alkaline earth metal or ammonium salts thereof, and from aryl sulphonic acids.

2. The process of claim 1 wherein the silica or calcium silicate has an average particle size of from about 0.01 to about 0.1 microns.

3. The process of claim 1 wherein the shearing is for about 0.25 to about 10 minutes.

4. The process of claim 3 in which the shearing is on a rubber mill or in an internal mixer.

5. The process of claim 1 wherein the hydrocarbyl polymer is a $C_4$-$C_6$ conjugated diolefin polymer containing hydroxyl groups, a polymer containing hydroxyl groups of a $C_4$-$C_6$ conjugated diolefin and at least one other copolymerizable vinyl or vinylidene-containing monomer, a polymer containing hydroxyl groups comprising a $C_4$-$C_6$ isoolefin or a polymer containing hydroxyl groups comprising one or two alpha olefins.

6. The process of claim 1 in which the vulcanization is by heating at 125° to 200° C. for times of from 1 minute to 10 hours.

7. Improved silica or calcium silicate filled rubbery vulcanizates obtained by the vulcanization of a mixture comprising 100 parts by weight of a vulcanizable hydrocarbyl polymer containing from about 1.5 to about 80 millimoles of hydroxyl groups per 100 grams of polymer, from 5 to about 100 parts by weight of silica or calcium silicate, and from about 1 to about 5 parts by weight of an organic acid or a salt thereof, said mixture having been subjected to shearing at a temperature of from about 100° to about 175° C. prior to incorporation of vulcanization active compounds and vulcanization, said organic acid or salt thereof being selected from the $C_{15}$-$C_{20}$ fatty acids, the $C_{15}$-$C_{20}$ unsaturated fatty acids and the aromatic carboxylic acids, or the alkali metal, alkaline earth metal or ammonium salts thereof, and from aryl sulphonic acids.

8. The vulcanizate of claim 7 wherein the shearing is for about 0.25 to about 10 minutes and the silica or calcium silicate has an average particle size of from about 0.01 to about 0.1 microns.

9. The vulcanizate of claim 7 in which the hydrocarbyl polymer is a $C_4$-$C_6$ conjugated diolefin polymer containing hydroxyl groups, a polymer containing hydroxyl groups of a $C_4$-$C_6$ conjugated diolefin and at least one other copolymerizable vinyl or vinylidene-containing monomer, or polymer containing hydroxyl groups comprising a $C_4$-$C_6$ isoolefin or a polymer containing hydroxyl groups comprising one or two alpha olefins.

10. The vulcanizate of claim 9 wherein the hydrocarbyl polymer is selected from butadiene-styrene polymers containing hydroxyl groups, butadiene-acrylonitrile polymers containing hydroxyl groups, isoprene-acrylonitrile polymers containing hydroxyl groups and butadiene-methacrylonitrile polymer containing hydroxyl groups.

11. The vulcanizate of claim 10 in which the hydroxyl groups have been incorporated into the polymer by emulsion free radical copolymerization with a monomer selected from hydroxyethyl acrylate, hydroxyethyl methacrylate, hydroxypropyl acrylate, hydroxypropyl methacrylate, hydroxypropyl cortonate, di-(2-hydroxyethyl)maleate, di-(2-hydroxy ethyl) fumarate, N-ethanol acrylamide, hydroxyethyl vinyl ether and diethylene glycol vinyl ether.

12. The vulcanizate of claim 9 wherein the hydrocarbyl polymer is selected from polybutadiene containing hydroxyl groups, isobutylene-isoprene polymers containing hydroxyl groups, chlorinated or brominated isobutyleneisoprene polymers containing hydroxyl groups, ethylenepropylene polymers containing hydroxyl groups, and ethylenepropylene- non-conjugated diolefin polymers containing hydroxyl groups.

13. The vulcanizate of claim 10 wherein the organic acid or salt thereof is palmitic acid or stearic acid, or the sodium, potassium, calcium, zinc or ammonium salt thereof.

14. The vulcanizate of claim 10 wherein the organic acid or salt thereof is oleic or linoleic acid, or the sodium, potassium, calcium, zinc or ammonium salt thereof.

15. The vulcanizate of claim 10 wherein the organic acid or salt thereof is benzoic, phthalic, cinnamic or hydroxybenzoic acid, or the sodium, potassium, calcium, zinc or ammonium salt thereof.

16. The vulcanizate of claim 10 in which the organic acid is benzene sulphonic acid, toluene sulphonic acid or xylene sulphonic acid.

17. The vulcanizate of claim 8 wherein the hydrocarbyl polymer is a butadiene-acrylonitrile polymer containing copolymerized therewith hydroxyethyl acrylate or methacrylate or hydroxypropyl acrylate or methacrylate and the organic acid or salt thereof is stearic acid or the sodium, potassium or zinc salt thereof.

18. The vulcanizate of claim 8 wherein the hydrocarbyl polymer is a styrene-butadiene polymer containing copolymerized therewith hydroxyethyl acrylate or methacrylate or hydroxypropyl acrylate or methacrylate and the organic acid or salt thereof is stearic acid or the sodium, potassium or zinc salt thereof.

19. The vulcanizate of claim 17 in which the polymer is mixed with a butadiene-acrylonitrile polymer containing no hydroxyl groups in such a proportion that the concentration of hydroxyl groups is from about 4 to about 60 millimoles per 100 grams of the mixture of polymers.

20. The vulcanizate of claim 18 in which the polymer is mixed with a styrene-butadiene polymer containing no hydroxyl groups in such a proportion that the concentration of hydroxyl groups is from about 4 to about 60 millimoles per 100 grams of the mixture of polymers.

* * * * *